(12) United States Patent
Samrgandi

(10) Patent No.: US 9,410,254 B2
(45) Date of Patent: Aug. 9, 2016

(54) HHO SYSTEM, HIGH PRODUCTION OF HYDROGEN GAS

(71) Applicant: Najwa H. Samrgandi, Ambridge, PA (US)

(72) Inventor: Najwa H. Samrgandi, Ambridge, PA (US)

( * ) Notice: Subject to any disclaimer, the term of this patent is extended or adjusted under 35 U.S.C. 154(b) by 274 days.

(21) Appl. No.: 14/061,089

(22) Filed: Oct. 23, 2013

(65) Prior Publication Data

US 2015/0107990 A1    Apr. 23, 2015

(51) Int. Cl.
| | |
|---|---|
| C25B 1/04 | (2006.01) |
| C25B 15/02 | (2006.01) |
| C25B 15/08 | (2006.01) |

(52) U.S. Cl.
CPC . *C25B 1/04* (2013.01); *C25B 15/02* (2013.01); *C25B 15/08* (2013.01); *Y02E 60/366* (2013.01)

(58) Field of Classification Search
CPC . C25B 1/02–1/12; C25B 15/02; C25B 15/08; Y02E 60/366
See application file for complete search history.

(56) References Cited

U.S. PATENT DOCUMENTS

| | | | | |
|---|---|---|---|---|
| 2004/0112739 A1* | 6/2004 | Kim | ............................. | C25B 1/06 204/237 |
| 2008/0047830 A1* | 2/2008 | Fairfull | ..................... | C25B 1/06 204/276 |
| 2008/0302670 A1* | 12/2008 | Boyle | ........................ | C01B 3/32 205/465 |
| 2011/0289951 A1* | 12/2011 | Furlong | .................... | F28B 1/06 62/171 |
| 2012/0210739 A1* | 8/2012 | Cobb | ......................... | F24F 1/58 62/121 |
| 2013/0019614 A1* | 1/2013 | Campbell | ......... | H05K 7/20136 62/62 |
| 2013/0061822 A1* | 3/2013 | Adair | ........................ | C25B 1/04 123/3 |
| 2014/0096556 A1* | 4/2014 | Emam | ..................... | F25B 19/00 62/310 |

FOREIGN PATENT DOCUMENTS

| | | |
|---|---|---|
| CN | 201525890 | 7/2010 |
| CN | 101949022 | 1/2011 |
| CN | 101775611 | 3/2011 |
| KR | 2000-0061954 | 10/2000 |

* cited by examiner

*Primary Examiner* — Ciel Thomas
(74) *Attorney, Agent, or Firm* — Oblon, McClelland, Maier & Neustadt, L.L.P

(57) ABSTRACT

The invention discloses a hydrogen/oxygen (HHO) system containing a HHO generator and a Zeer pot which is configured to reduce a temperature inside the HHO generator by evaporation of water on a surface of the Zeer pot. The Zeer pot contains a radiator which cools an electrolytic solution for the HHO generator. The HHO system also contains a pump and a reservoir tank which is in fluid communication with the radiator to pump the electrolytic solution from the radiator back to the HHO generator, and a demister which is installed downstream of the HHO generator to remove steam from hydrogen and oxygen gas generated in the HHO generator.

16 Claims, 3 Drawing Sheets

HHO SYSTEM, HIGH PRODUCTION OF HYDROGEN GAS

This application was prepared with financial support from the Saudi Arabian Cultural Mission (SACM), and in consideration therefore the present inventor has granted The Kingdom of Saudi Arabia a non-exclusive right to practice the present disclosure.

BACKGROUND OF THE INVENTION

1. Field of the Disclosure

The present invention relates to a HHO generator (hydrogen/oxygen generator) which generates gases from an aqueous solution. A Zeer pot is configured to reduce the temperature inside the HHO generator by evaporation of water on the surface of the Zeer pot.

2. Description of Related Art

In light of dwindling supplies of natural resources and global warming, there has been motivation to find alternative and sustainable power sources to condense harmful emissions from internal combustion engines and to supplement the hydrocarbon fuels that are burned in them. A hydrogen economy is proposed, which consists of delivering energy using hydrogen. Hydrogen produces water as a by-product, is high in energy, and yet an engine that burns pure hydrogen produces almost no pollution. Furthermore, electrolysis of water, an abundant natural resource, produces hydrogen. However, in order to replace carbon-based fossil fuels, an entire manufacturing and distributing network for hydrogen must be created.

Proponents of a hydrogen economy suggest that hydrogen is an environmentally cleaner source of energy. Thermodynamically, generating hydrogen and oxygen by electrolysis of water requires more energy than is produced from regenerating water by burning the hydrogen and oxygen. However, when supplemental hydrogen and oxygen is added to an internal combustion engine, there is an increase in efficiency and a reduction in emissions, because the supplemental hydrogen and oxygen enables the engine to burn the hydrocarbon fuel more efficiently.

Another concern is maintaining electrolyte level and temperature within desired limits in the hydrogen generator. Therefore, a demand still exists not only for a practical electrolytic hydrogen generator for an internal combustion engine, but also a hydrogen generator used as an energy storage medium, in which electrolyte levels and temperature can be controlled.

BRIEF SUMMARY

The present invention provides a safe and practical hydrogen/oxygen generator to generate gases from an aqueous solution. The invention improves high production of hydrogen and oxygen gas compared to other HHO generators of the same size, by using a Zeer pot to cool the solution inside the HHO generator.

In one embodiment, a Zeer pot is configured to reduce the temperature inside the HHO generator by evaporation of water on the surface of the Zeer pot.

In one aspect of the invention, the system further comprises a radiator inside the Zeer pot which cools an electrolytic solution for the HHO generator by evaporation of water on a surface of the Zeer pot.

In another aspect of the invention, the system further comprises a pump which is in fluid communication with the radiator to pump the electrolytic solution from the radiator back to the HHO generator.

In one embodiment of the invention, the system further comprises a demister (filter) which is installed downstream of the HHO generator to remove steam from hydrogen and oxygen gas generated in the HHO generator.

In another embodiment, the HHO generator has outlet tubes to allow gases produced inside the HHO generator to exit the HHO generator.

In another embodiment of the invention, the system further comprises a fan above of the Zeer pot. The fan is configured to blow air downward to the surface of the Zeer pot to promote evaporation of water from the Zeer pot.

DETAILED DESCRIPTION

Figure 1:
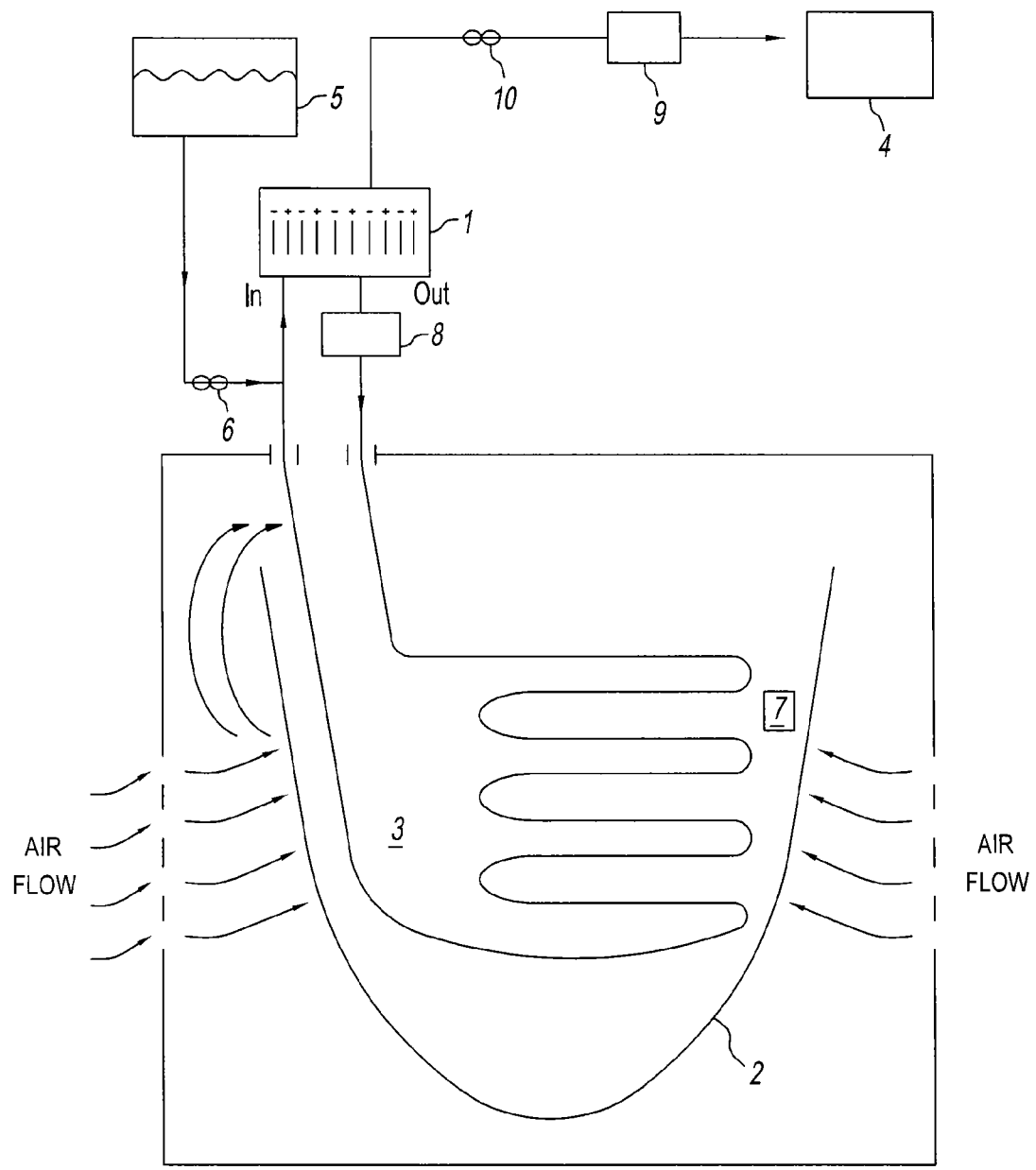
FIG. 1 is a schematic illustration of an embodiment of the invention showing the HHO system comprising the HHO generator, the Zeer pot, and the radiator.

FIG. 1 illustrates a system according to the present invention. In this embodiment, the system comprises a HHO generator (1), a Zeer pot (2) configured to reduce the temperature which is inside the HHO generator (1), water inside the Zeer pot (2), and a radiator (3) inside the Zeer pot (2) which cools an electrolytic solution for the HHO generator (1). The system produces hydrogen and oxygen by evaporation of water, which is then delivered to an engine (4).

The HHO system has a water reservoir (5) that holds water, preferably distilled water. The reservoir (5) compensates the water that goes inside the HHO generator (1) through a one-way valve (6), because the electric interaction of the electrolyte produces a shortage in the amount of distilled water inside the generator (1). Therefore, the reservoir (5) compensates for the shortfall of distilled water inside the HHO generator (1).

The water inside the reservoir (5) does not communicate with the water inside the Zeer pot (2). The lack of water inside the Zeer pot (2) is either compensated manually, or a float (7) and valve water are installed. The Zeer pot (2) contains tap water. The purpose of the float (7) is to show the lack of water inside the Zeer pot (2). The volume of water inside the Zeer pot (2) and the reservoir (5) depends on the system's size, in order for production of hydrogen and oxygen gas.

The Zeer pot (2) is preferably constructed of natural clay. The Zeer pot (2) constructed of natural clay displays to high temperatures to form small pores to evaporate the water. These pores cause the water to evaporate through the Zeer pot (2) surface. The sizes of the pores vary, depending on the clay material and temperature.

Porosity of the natural clay Zeer pot (2) may be essential to the cooling element of the Zeer pot (2) depending on the weather and temperature. For example, in high temperatures, such as 50° C., it is recommended for the porosity of the natural clay to be larger than if the weather temperature is low.

A thickness of the Zeer pot (2) depends on the weather and temperature. For example, in high temperatures such as 50° C., it is recommended for the Zeer pot (2) to be thinner than if the temperature is low.

The reservoir (5) tank is positioned at a higher elevation than the HHO generator (1), because the entire HHO generator (1) has to be fully covered by solution. Further, this positioning makes water shortage easily noticeable. If the reservoir (5) tank is positioned at a lower elevation than the HHO generator (1), the generator (1) will not produce hydrogen and oxygen gas because the generator (1) will not be fully covered with solution, and water shortage in the generator (1) will be unnoticed.

A solution in the HHO generator (1) is cooled by circulation through the heat exchange, which is inside the Zeer pot (2), in which the solution is contained inside a radiator (3) with inlet and outlet ends connected to the HHO generator (1). The HHO generator (1) contains an electrolyte and distilled water. The electric exchange process includes steaming distilled water and converting it to hydrogen gas. The remaining electrolytic solution speeds up the power exchange.

Through the electric exchange process in the HHO generator (1), there is heat production in the solution. The solution moves through the pump (8) to the radiator (3), which is located inside the Zeer pot (2). Heat transfers through the heat exchange through the radiator (3) and the water inside the Zeer pot (2). Therefore, the solution absorbs the coolness from inside the Zeer pot (2) and moves to the HHO generator (1).

The electrolyte in the solution is sodium hydroxide or potassium hydroxide. The electrolyte is preferably potassium hydroxide, because it does not lead to iron rust, and the coefficient electric exchange is high. The distilled water for the generator (1) is compensated by the reservoir (5) tank. However, the electrolyte in the generator (1) does not need to be replenished.

The generator (1) contains an inlet and outlet to communicate with the radiator (3) in the Zeer pot (2). The inlet and outlet circulate the solution through the generator (1) in a cooling loop to counteract the effects of electrical heating. The heated fluid is drawn from the reactor through the outlet to the inlet of the pump (8). Then, the fluid is pumped through the radiator (3) where it is cooled and subsequently returned through the inlet to the generator (1).

Heating the solution excessively results in a loss of ability to conduct electric current, which limits hydrogen and oxygen production via electrolysis. Therefore, the radiator (3) enables the employment of higher electrical currents which, yields larger quantities of hydrogen and oxygen. In one embodiment, the system is configured to operate for extended periods at high amperage. Cooling the radiator (3) consumes a larger amount of electricity to produce larger amounts of hydrogen and oxygen gas. By cooling the solution, the system may operate at twice the amperage. Increasing electricity without cooling the solution will result in water vapors, which will affect the engine (4).

The demister (9) separates the water steam from the gas, so in case there is steam water coming from the generator (1), the demister (9) will separate the steam from the gas before the steam goes into the engine (4), in order to protect the engine (4). There is a one-way valve (10) between the generator (1) and the demister (9).

Figure 2:
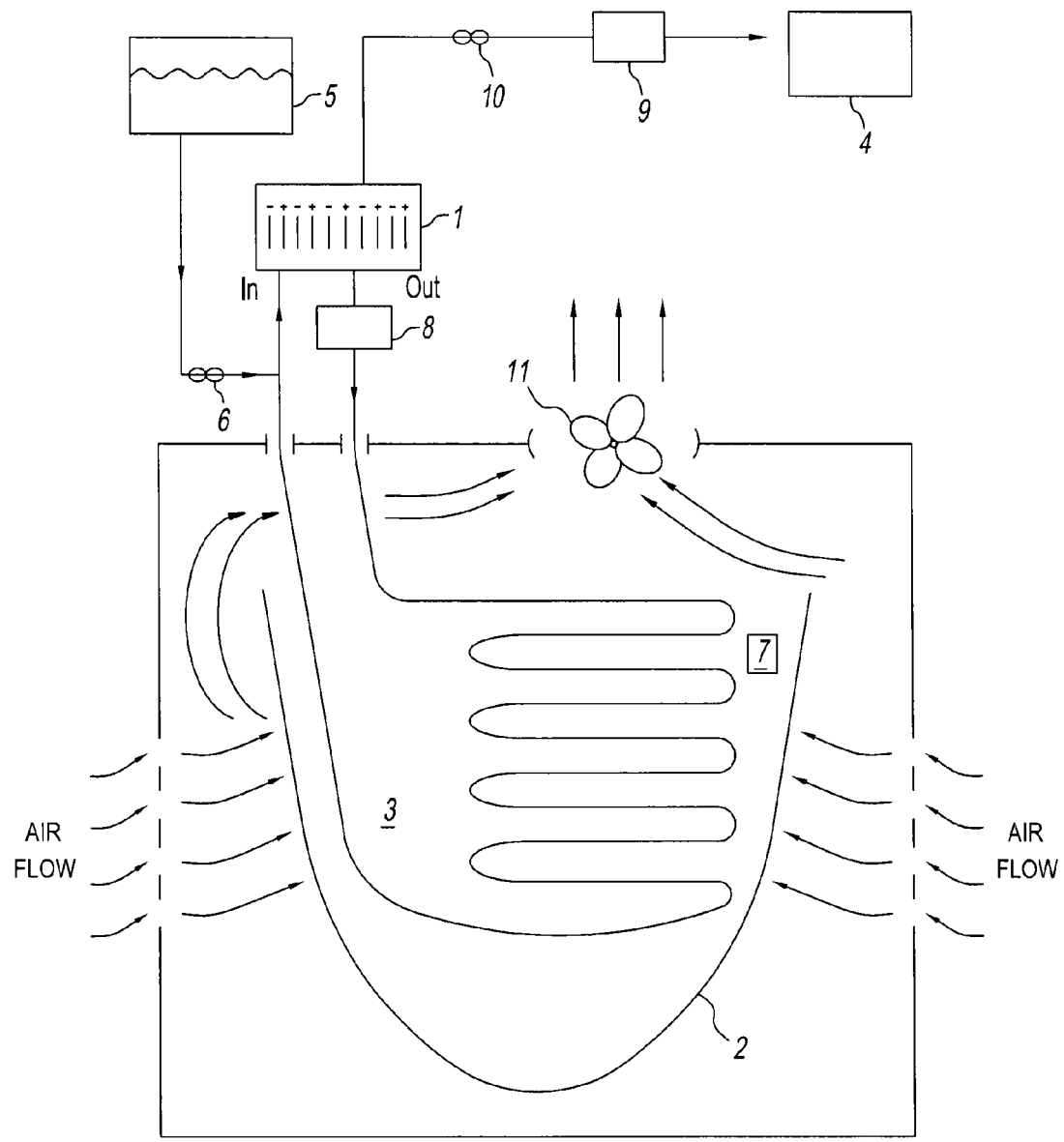
FIG. 2 is a schematic illustration of a preferred embodiment of the invention showing the HHO system comprising the HHO generator, the Zeer pot, the radiator, and a fan.

FIG. 2 illustrates a system according to the present invention. In this embodiment, the system comprises a HHO generator (1), a Zeer pot (2), a radiator (3) and water inside the Zeer pot (2), and a fan (11) which is installed above the Zeer pot (2) to blow downward to the surface of the Zeer pot (2) to promote evaporation of water from the Zeer pot (2). The hydrogen and oxygen gas produced are then supplied to an engine (4).

The fan (11) helps evaporate the water on the Zeer pot (2) surface and dry the evaporated water, thereby making the surface cold. Then, the surface helps cool the water inside the Zeer pot (2), which will cool the radiator (3) inside the Zeer pot (2). The radiator (3) then cools the solution inside the radiator (3), which in turn cools the solution inside the HHO generator (1), causing high production of HHO gas.

The fan (11) at the top of the Zeer pot (2) drags the air and passes it onto the Zeer pot (2) surface. The air works on the evaporation of water on the surface of the Zeer pot (2) and thus becomes a heat exchange, which works on cooling the water inside the Zeer pot (2). The fan (11) is preferably an axial-flow fan.

Figure 3:
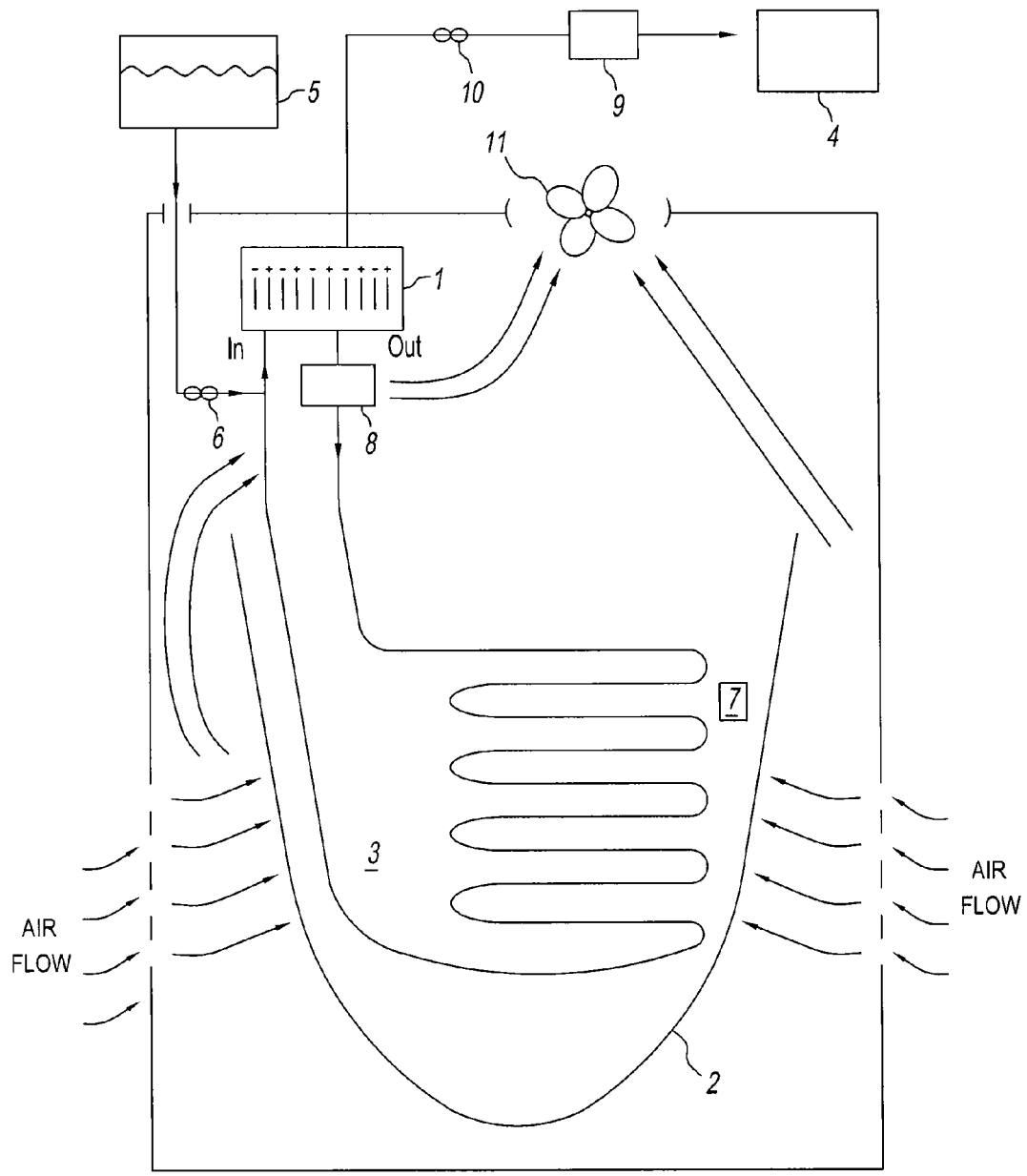
FIG. 3 is a schematic illustration of a preferred embodiment of the invention showing the HHO system comprising the HHO generator, the Zeer pot, the radiator, and a fan.

FIG. 3 illustrates a system according to the present invention. In this embodiment, the system comprises a HHO generator (1), a Zeer pot (2), a radiator (3) and water inside the Zeer pot (2), and a fan (11) which is installed with a top of the Zeer pot (2), in which the outer container encompasses the HHO generator (1) and the pump (8). The hydrogen and oxygen gas produced are supplied to an engine (4).

The foregoing discussion discloses and describes merely exemplary embodiments. As will be understood by those skilled in the art, the present application may be embodied in other specific forms without departing from the spirit or essential characteristics thereof. Accordingly, the present disclosure is intended to be illustrative, but not limiting of the scope of the application, as well as other claims. The disclosure, including any readily discernible variants of the teachings herein, defines, in part, the scope of the foregoing claim terminology such that no inventive subject matter is dedicated to the public.

The invention claimed is:

1. A hydrogen/oxygen (HHO) system comprising:
a HHO generator comprising an electrolytic solution comprising an electrolyte and a first amount of distilled water, configured to electrically convert the first amount of distilled water into hydrogen and oxygen;
a reservoir tank comprising a second amount of distilled water, in fluid communication with the HHO generator via a first single feed line, configured to compensate for a shortage in the first amount of distilled water inside the HHO generator;
an inner Zeer pot filled with water, comprising an outer surface and a radiator inside the inner Zeer pot, configured to cool the HHO generator by the radiator's heat exchange and the inner Zeer pot's evaporative cooling of the electrolytic solution supplied to the radiator via a single coolant line, wherein the evaporative cooling comprises evaporation of the water inside the inner Zeer pot from the outer surface of the inner Zeer pot;
an outer housing enclosing the inner Zeer pot such that an enclosed space exists between the outer housing and the inner Zeer pot;
a fan in the outer housing above the inner Zeer pot, configured to blow air downward to promote the evaporation of the water inside the inner Zeer pot from the outer surface of the inner Zeer pot;
a pump in fluid communication with the radiator, configured to pump the electrolytic solution from the HHO generator and from the radiator back to the HHO generator; and
a demister installed downstream of the HHO generator, configured to remove steam from the generated hydrogen and oxygen;
wherein the HHO generator is open to the environment in order to allow water vapor and the generated hydrogen and oxygen to exit the HHO generator.

2. The system of claim 1, wherein the inner Zeer pot is made of natural clay.

3. The system of claim 1, wherein the reservoir tank is positioned at a higher elevation than the HHO generator.

4. The system of claim 1, wherein the electrolytic solution is inside the radiator with inlet and outlet ends connected to the HHO generator.

5. The system of claim 1, wherein the electrolyte is at least one selected from the group consisting of potassium hydroxide and sodium hydroxide.

6. The system of claim 5, wherein the electrolyte is potassium hydroxide.

7. The system of claim 1, wherein the water in the inner Zeer pot comprises tap water.

8. The system of claim 1, wherein the fan is an axial-flow fan.

9. The system of claim 1, further comprising a float inside the inner Zeer pot to determine a lack of the water inside the inner Zeer pot.

10. The system of claim 1, wherein the first single feed line comprises a first one-way valve.

11. The system of claim 1, wherein the HHO generator and the demister are connected via a second single feed line comprising a second one-way valve.

12. The system of claim 3, wherein the positioning of the reservoir tank at a higher elevation than the HHO generator allows water shortage in the HHO generator to be noticed.

13. The system of claim 1, wherein the distilled water inside reservoir tank and the water inside the inner Zeer pot are not in fluid communication with each other.

14. The system of claim 1, wherein the HHO generator is fully covered with the electrolytic solution.

15. The system of claim 1, wherein the outer housing further encloses the HHO generator and the pump.

16. A hydrogen/oxygen (HHO) system consisting of:
 a HHO generator comprising an electrolytic solution comprising an electrolyte and a first amount of distilled water, configured to electrically convert the first amount of distilled water into hydrogen and oxygen;
 a reservoir tank comprising a second amount of distilled water, in fluid communication with the HHO generator via a single feed line, configured to compensate for a shortage in the first amount of distilled water inside the HHO generator;
 an inner Zeer pot filled with water, comprising an outer surface and a radiator inside the inner Zeer pot, configured to cool the HHO generator by the radiator's heat exchange and the inner Zeer pot's evaporative cooling of the electrolytic solution supplied to the radiator via a single coolant line, wherein the evaporative cooling comprises evaporation of the water inside the inner Zeer pot from the outer surface of the Zeer pot;
 an outer housing enclosing the inner Zeer pot such that an enclosed space exists between the outer housing and the inner Zeer pot;
 a fan in the outer housing above the inner Zeer pot, configured to blow air downward to promote the evaporation of the water inside the inner Zeer pot from the outer surface of the inner Zeer pot;
 a pump in fluid communication with the radiator, configured to pump the electrolytic solution from the HHO generator and from the radiator back to the HHO generator; and
 a demister installed downstream of the HHO generator, configured to remove steam from the generated hydrogen and oxygen;
 wherein the HHO generator is open to the environment in order to allow water vapor and the generated hydrogen and oxygen to exit the HHO generator.

* * * * *